(12) United States Patent
Ioffe et al.

(10) Patent No.: US 12,461,201 B2
(45) Date of Patent: Nov. 4, 2025

(54) SINGLE-POINT RADAR CROSS SECTION APPROACHES FOR RADAR SIMULATION

(71) Applicant: Aptiv Technologies AG, Schaffhausen (CH)

(72) Inventors: Alexander Ioffe, Bonn (DE); Mohannad Saifo, Wuppertal (DE); Markus Stefer, Remscheid (DE)

(73) Assignee: Aptiv Technologies AG, Schaffhausen (CH)

( * ) Notice: Subject to any disclaimer, the term of this patent is extended or adjusted under 35 U.S.C. 154(b) by 503 days.

(21) Appl. No.: 18/154,651

(22) Filed: Jan. 13, 2023

(65) Prior Publication Data

US 2023/0258770 A1    Aug. 17, 2023

Related U.S. Application Data

(60) Provisional application No. 63/268,059, filed on Feb. 15, 2022, provisional application No. 63/267,914, filed on Feb. 11, 2022.

(51) Int. Cl.
*G01S 7/40* (2006.01)
*G01S 7/41* (2006.01)
*G01S 13/931* (2020.01)

(52) U.S. Cl.
CPC .............. *G01S 7/4082* (2021.05); *G01S 7/41* (2013.01); *G01S 13/931* (2013.01)

(58) Field of Classification Search
CPC .... G01S 7/4052; G01S 7/4056; G01S 7/4078; G01S 7/4082; G01S 7/41; G01S 13/931
See application file for complete search history.

(56) References Cited

U.S. PATENT DOCUMENTS

| 7,880,671 B2* | 2/2011 | Lee ................. G01S 7/412 |
|  |  | 342/159 |
| 2017/0115378 A1* | 4/2017 | Haghighi ........... G01S 7/4052 |
| 2020/0111382 A1 | 4/2020 | Sarabandi et al. |
| 2022/0099824 A1* | 3/2022 | Beer ................ B60W 60/001 |

(Continued)

FOREIGN PATENT DOCUMENTS

WO    2020200454 A1    10/2020

OTHER PUBLICATIONS

Markus Buhren et al.,"ExtensionofAutomotiveRadarTargetListSimulationtoconsiderfurtherphysicalaspects", Telecommunications,2007ITST,7thInternationalConferenceonITS,IEEE,Piscataway,NJ,USA,Jun. 1, 2007,6 pages (Year: 2007).*

(Continued)

*Primary Examiner* — Peter M Bythrow
(74) *Attorney, Agent, or Firm* — Harness, Dickey & Pierce, P.L.C.

(57) ABSTRACT

This document describes techniques and systems for enabling more-accurate single-point radar cross section (RCS) approaches for radar simulations without introducing orders of complexity. For automotive radar applications, considering variations in RCS radial patterns, with both angle and range, and because of analytically calculated multi-path effects and near-field RCS effects improves simulation accuracy by incorporating multi-path phenomenon that is present due to ground reflections. The described techniques are performed without using full scale ray-tracing or other computationally demanding techniques.

20 Claims, 10 Drawing Sheets

(56) References Cited

U.S. PATENT DOCUMENTS

| | | | |
|---|---|---|---|
| 2023/0099845 A1 | 3/2023 | Cai et al. | |
| 2023/0102079 A1* | 3/2023 | Cai | G01S 7/4052 |
| | | | 342/174 |
| 2023/0117339 A1 | 4/2023 | Cai et al. | |
| 2024/0061078 A1* | 2/2024 | Gulden | G01S 13/931 |

OTHER PUBLICATIONS

"Extended European Search Report," EP Application No. 23156136, Jun. 15, 2023, 13 pages.

Markus Buhren et al., "Extension of Automotive Radar Target List Simulation to consider further physical aspects", Telecommunications, 2007 ITST, 7th International Conference on ITS, IEEE, Piscataway, NJ, USA, Jun. 1, 2007, 6 pages.

"Extended European Search Report", EP Application No. 22195641.0, Jan. 31, 2023, 10 pages.

Buddendick, et al., "Bistatic Scattering Center Models for the Simulation of Wave Propagation in Automotive Radar Systems", German Microwave Conference 2010, Apr. 2010, pp. 288-291.

Cai, "Autonomous Vehicles: MMW Radar Backscattering Modeling of Traffic Environment, Vehicular Communication Modeling, and Antenna Designs", Oct. 4, 2020, 318 pages.

Deep, et al., "Radar Cross-Sections of Pedestrians at Automotive Radar Frequencies Using Ray Tracing and Point Scatterer Modelling", vol. 14, Issue 6, Jun. 2020, pp. 833-844.

Kefeng, et al., "Simulation of SAR Images of Ground Vehicles", Proc. SPIE 7495, MIPPR 2009: Automatic Target Recognition and Image Analysis, Oct. 30, 2009, 7 pages.

Chipengo, et al., "High Fidelity Physics Simulation of 128 Channel MIMO Sensor for 77GHz Automotive Radar", Sep. 2, 2020, pp. 160643-160652.

Dallman, et al., "ATRIUM: A Radar Target Simulator for Complex Traffic Scenarios", Apr. 2018, 4 pages.

Gowdu, et al., "Monostatic RCS measurements of a passenger car mock-up at 77 GHz frequency in virtual environment", Oct. 2019, 4 pages.

Gowdu, et al., "Monostatic RCS Measurements of Representative Road Traffic Objects in the 76 . . . 81 GHZ Frequency Band", 6 pages.

Ling, et al., "Shooting and Bouncing Rays: Calculating the RCS of an Arbitrarily Shaped Cavity", Feb. 1989, pp. 194-205.

Saifo, et al., "Using RCS Radial Pattern Combined with Multi-Path Effect for Automotive Radar Simulations", 2022 52nd European Microwave Conference (EuMC), pp. 286-289.

Yang, et al., "Novel Extension of SBR-PO Method for Solving Electrically Large and Complex Electromagnetic Scattering Problem in Half-Space", Jul. 2017, pp. 3931-3940.

\* cited by examiner

SINGLE-POINT RADAR CROSS SECTION APPROACHES FOR RADAR SIMULATION

CROSS-REFERENCE TO RELATED APPLICATIONS

This application claims the benefit of U.S. Provisional Patent Application No. 63/267,914, filed Feb. 11, 2022, as well as U.S. Provisional Patent Application No. 63/268,059, filed Feb. 15, 2022, each of which are incorporated by reference herein, in their entirety.

BACKGROUND

Radars are useful devices to detect and track objects. Accordingly, radar provides many advantages for autonomous-driving applications or driver-assistance applications. During engineering and development, a radar simulation may be run to evaluate performance of the radar in various conditions. To reduce complexity, these simulations may represent a target response as single-point radar cross section (RCS). The single-point RCS may be an oversimplification of an actual radar response from a target, which decreases accuracy and usefulness of a radar simulation.

SUMMARY

This document describes techniques and systems for enabling more-accurate single-point RCS approaches for radar simulations without introducing orders of complexity. For automotive radar applications, considering variations in RCS radial patterns with both angle and range, and because of analytically calculated multi-path effects improves simulation accuracy by incorporating multi-path phenomenon that is present due to ground reflections, e.g., without using full scale ray-tracing or other computationally demanding techniques.

In one example, a method includes enabling more-accurate single-point RCS approaches for radar simulations without introducing orders of complexity. For example, actual antenna responses to represent RCS fluctuations caused by target range may be simulated, including for the near range. Existing simulation technology is then used to consider range dependent road impacts to the target RCS in a computationally effective way. The information obtained from both road multi-path and near field simulations are combined to create a more accurate angular and range dependent RCS map associated with a single-point representation of a target for fast environmental simulations. Accuracy may be improved yet further by optionally representing important targets (e.g., cars and trucks) as many RCS points rather than a single-point RCS. With multiple RCS points, the simulation may optionally be programmed to account for occlusion and directivity caused between two sections of the same target The method may include determining, over a plurality of target ranges, antenna responses obtained with an electromagnetic sensor that is positioned in free space. The method may also include determining, for the plurality of target ranges, multi-path effects and near-field effects on the electromagnetic sensor when installed on a vehicle. The method may then include, based on the antenna responses with the multi-path effects and the near-field effects, generating a response map of expected responses for the electromagnetic sensor given a plurality of single-point locations proximate the vehicle, each expected response accounting for a corresponding angular and range dependent ground effect determined for that single-point location. In addition, the method may include outputting the response map to a sensor simulator configured to test detection accuracy of a simulated object located at a particular single-point location given the expected response defined by the response map for that particular single-point location.

In some examples, the expected responses each include a target radar cross section adjusted for the corresponding angular and range dependent ground effect determined for that single-point target location. The target radar cross section for each of the expected responses may be dependent on a target angle and target range between the vehicle and that single-point target location. The expected responses may each have a target signal to noise ratio that is greater than a detection threshold of the electromagnetic sensor. In other words, as described herein, a plurality of target ranges are to be one or more relative positions or distances from the electromagnetic sensor inclusive of expected distances or ranges for targets being detected with the sensor when installed on the vehicle. An example of a plurality of target ranges can include a first range (e.g., at or less than 20 meters) and a second range (e.g., between 20 and 30 meters). The plurality of target ranges can define a target range to be zero or near zero, or any other potential detection distance for the sensor up to a maximum detectable target range (e.g., 1000 meters).

In another example, a system includes at least one processor configured to perform the above-summarized method and other methods set forth herein. Also described is a system comprising means for performing the above-summarized method and other methods set forth herein, a non-transitory computer-readable medium such as computer-readable storage media comprising instructions that, when executed, cause at least one processor to perform the above-summarized method and other methods set forth herein. A computer system comprising a simulation software program (e.g., a radar simulator) may be configured to utilize the response map output from performance of the above-summarized method and other methods set forth herein. A computer software product may be configured to execute on computer hardware to cause the computer hardware to perform the above-summarized method and other methods set forth herein.

This Summary introduces techniques for enabling single-point RCS approaches for radar simulation and are further described in the Detailed Description and Drawings. The document is written primarily in the context of radar sensors and radar simulators. Besides radar, the techniques and systems described herein can be used to improve simulations of a target response to any high frequency sensor or perception technology (e.g., microwave applications, Wi-Fi, cellular phone applications). This Summary is not intended to identify essential features of the claimed subject matter, nor is it intended for use in determining the scope of the claimed subject matter.

BRIEF DESCRIPTION OF THE DRAWINGS

The details of one or more aspects for enabling more-accurate single-point RCS approaches for radar simulations without adding orders of complexity are described in this document with reference to the following figures, in which like numbers are used throughout to represent same or similar drawing features:

FIGS. 3-1 through 3-8 illustrate example results of applying more-accurate single-point RCS approaches in radar simulation, in accordance with techniques of this disclosure.

DETAILED DESCRIPTION

Figure 1:
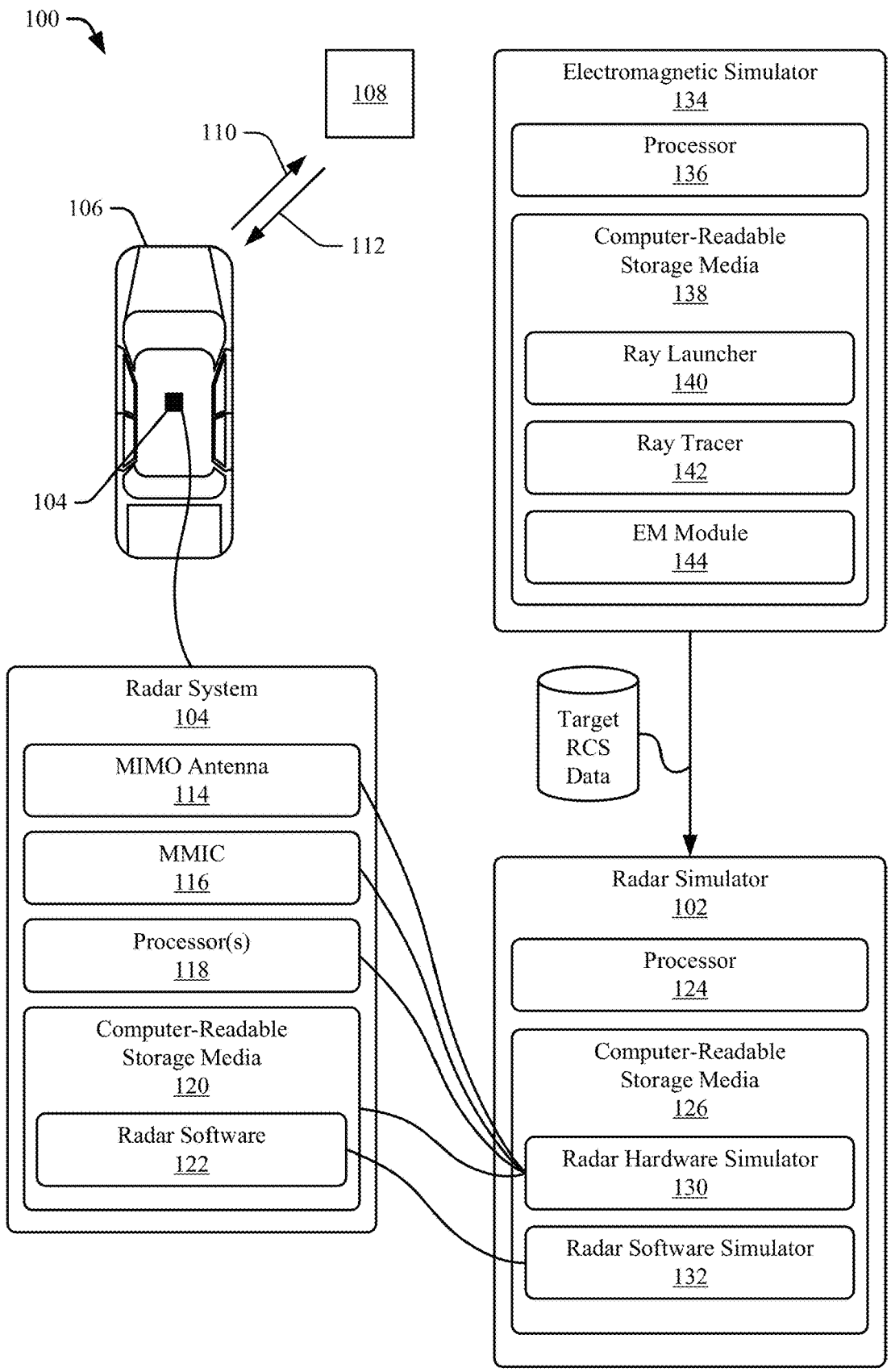
FIG. 1 illustrates an example environment in which components of a radar system are simulated using more-accurate single-point RCS approaches, in accordance with techniques of this disclosure.

Radar is increasingly used for environmental perception in automotive applications (e.g., autonomous control, semi-autonomous control, advanced safety warning, collision avoidance) due to its advantageous capabilities in many driving conditions. It is a challenge to develop computer-based radar algorithms that have performance specifications that expect radar signals to be processed quickly into various forms of radar data that is generated in support of perception tasks performed on the vehicle. A model may be used to improve radar processing speed; however, deployment of the model, especially when employing machine learning techniques, may need some initial tuning or training to work reliably in a wide range of scenarios. Performing an exhaustive list of real-world tests to generate large complex training data is impractical for most radar development, due to time and/or cost. Instead, simulation can generate these large data sets, which can then be used for evaluating, training, or tuning a radar to perform across many different driving conditions.

Various simulation methodologies may be used to train or tune a radar model. For instance, a full wave based finite element method (FEM), a method of moments (MOM), and a shooting and bouncing rays (SBR) method or other ray tracing technique are some existing ways to generate large data sets of target responses (also referred to herein as "expected responses") to support a large-scale automotive radar simulation. Even though these various simulation techniques have improved in speed due largely because of advancements in computing technology, there execution may still be too slow or cumbersome to be used outside of expensive computer laboratories.

To reduce complexity, radar simulations may represent expected responses (i.e., target responses) as a simpler, single-point RCS. In the real-world, the RCS of a target is dependent on multiple factors. Aside from angular fluctuations, the RCS may change as a function of target range, mounting height of the radar, and elevation profile of a road surface between the radar and the target range. For simplicity's sake, the single-point RCS associated with a target is often represented as a range invariant variable that is allowed to change only as a function of angle (e.g., an azimuth angle relative the radar and the target). Using these imprecise single-point RCS estimates instead of representing the target by its full geometry (e.g., height, width) is a gross oversimplification of an actual radar response from a target; the RCS is inaccurately reported as dependent on azimuth angle to the target, alone. This oversimplification enables many target responses to be simulated quickly, however, with far less accuracy than other simulation techniques that can account for other conditions that effect the RCS of a target.

For instance, slight variations in the RCS for different reflection positions on a target may be considered by some simulations to improve accuracy of single-point RCS representations. A target may have multiple surfaces that can reflect a radar signal differently from one surface to the next; a single-point of scatters may or may not be reflecting from a single, centralized point on a target but may instead be reflecting from an end or other part of the target. This can shift a start of a radar response to angularly depend not just on angle, but also on properties of the target surface at that target position. By simulating a frequency sweep across angles and performing fast-Fourier transformations to obtain a range profile, and then utilizing a range from the range profile as the reflection position for the target, accuracy of a simulated RCS may be improved.

Even with this improvement, however, existing representations of single-point RCS representations in radar simulation may not be accurate because RCS simulation results still assume far field conditions are met. For driving applications, some of the most important targets (e.g., trucks, cars) can have a remarkably high RCS and great dimensions in some directions. Ignoring range-based fluctuations in their RCS, as is done by existing simulations, is insufficient for accurately simulating a radar response, particularly at near ranges. The far-field conditions of a radar may not be adequately represented, and instead, a simulation may be limited in its usefulness, e.g., effective in simulating radar performance at a minimum range of only a few hundred meters. These and other drawbacks of existing simulation techniques do not appear to be recognized or even understood outside this disclosure. Some simulations consider variation in RCS at close range but fail to account or apply a correction to address variations in RCS to evaluate different near-field, as well as far-field, conditions. In fact, rather than account for far-field effects, these other simulations may use RCS values at ten meters or less as representative RCS values for all ranges, thereby limiting the usefulness of their techniques.

Existing simulations may fail to account for other conditions, besides range, which cause RCS fluctuations in the real-world. For instance, existing simulations in their target RCS representations do not consider multipath effects resulting from ground reflections with a road. That is, to minimize complexity of a simulation, presence of road surface reflections, which are (seemingly) always existent in driving scenarios, are often completely ignored, despite their presence causing significant changes to RCS behavior. It is, therefore, desirable to provide faster ways of modeling variations in target RCS values across many conditions to provide more accurate training or tuning data for simulating radar performance in a large or complex scene. For this reason, a simpler way to simulate realistic target responses for tuning or training a radar model in simulation is desired, particularly one which keeps to the spirit of representing targets as single-point (scattering centers) RCS maps.

In contrast to previous radar simulation techniques, this document describes techniques and systems for enabling more-accurate single-point RCS approaches for radar simulations without adding orders of complexity. As described herein, a radar simulator may execute on a central processing unit (CPU) and/or a graphical processing unit (GPU) of a computer to generate the target RCS response from a traffic scene that accounts for variations in angle in addition to range. The scene information (e.g., position, orientation, and velocity for all targets) and basic parameters of the transmitter/receiver (position, orientation, field-of-view, and operating frequency) can be taken as inputs to determine the RCS response and may be used in generating an output from the radar simulation that accounts for the RCS response. Range variations and multipath effects are analytically applied to RCS patterns associated with simulated targets, which results in a radial RCS map dependent on range and other conditions as opposed to being dependent on angle alone. The response map may define expected responses that each include a target RCS adjusted for the corresponding angular and range dependent ground effect simulated for that single-point target location. The target RCS for each of the expected responses may be dependent on a target angle and target range between the vehicle and that single-point target location. The expected responses may each have a target signal to noise ratio (SNR) that is greater than a detection threshold of the electromagnetic sensor.

For complicated objects like cars, considering a single RCS value for all possible ranges is not an accurate or sufficient simulation because a car's dimension causes or otherwise leads to a near field region extending a long distance that covers the entire range of the radar. As a result, a recorded RCS as defined in an anechoic chamber is not the same as the RCS for the far-field conditions. To improve the accuracy of the simulation, the RCS pattern conveyed by an example response map generated in accordance with the described techniques has recorded fluctuations in the RCS, at several ranges, which when output to the sensor simulator enables the simulation to better convey a variety of range-based fluctuations in the antenna responses simulated for the electromagnetic sensor undergoing simulation test. This leads to a radar simulation that applies a more realistic behavior to a target RCS, rather than oversimplifying the simulation by ignoring fluctuations in RCS due to conditions other than just angle alone. In addition to depending on angle, the RCS defined for a target is range dependent. In some cases, the RCS may be dependent on other considerations, such as target surface and multi-path reflections caused by the road.

To enable more-accurate single-point radar RCS approaches, the techniques and systems may adopt the following guidelines. For all targets, not just cars and trucks, road multipath conditions are simulated, which strongly increases accuracy of the radar simulation. For at least some of the most important simulation targets, such as the cars and trucks, range dependent fluctuations in RCS of the targets can be considered by assuming that the simulated radar is almost always at least partly in a near field mode. With the road multipath conditions simulated, and the range dependent fluctuations in their RCS can then be considered, with each of the targets represented by its own multi-dimensional (e.g., two-dimensional) RCS profile with values that accurately depend based at least in part on variations in both target angle (e.g., azimuth) and target range.

FIG. 1 illustrates an example simulated environment 100 in which components of a radar system 104 are simulated using more-accurate single-point RCS approaches, in accordance with techniques of this disclosure. In the environment 100, a radar simulator 102 interfaces with an electromagnetic simulator 134 and the radar system 104, which is simulated to be integrated within a vehicle 106.

The radar system 104 can be any type, including a continuous-wave or pulsed radar, a frequency-modulated or phase-modulated radar, a single-input single-output (SISO) or a multiple-input multiple-output (MIMO) radar, or some combination thereof, including a frequency-modulated continuous-wave (FMCW) MIMO radar, with or without a code-division multiple access (CDMA) scheme. The radar system 104 includes a MIMO antenna 114, at least one monolithic microwave integrated circuit (MMIC) 116, one or more processors 118, and computer-readable storage media (CRM) 120. The MMIC 116 includes circuitry and logic for transmitting and receiving radar signals via the MIMO antenna 114 and detect a target 108. These components enable sending of a transmit signal 110 and in response, detecting a corresponding receive signal 112, which can be processed into radar data for output to the vehicle 106 to perform perception related tasks. The MMIC 116 can include amplifiers, mixers, switches, analog-to-digital converters, or filters for conditioning the radar signals. The MMIC 116 also includes logic to perform in-phase/quadrature (I/Q) operations, such as modulation or demodulation but not restricted to that. The MMIC 116 can include at least one transmitter and at least one receiver, or a combined transceiver. The MIMO antenna 114 enables the radar system 104, in some scenarios, to shape a field-of-view by forming beams that are steered or un-steered, and wide or narrow. The steering and shaping can be achieved through analog beamforming or digital beamforming. Transmitting subarrays of the MIMO antenna 114 can have, for instance, an un-steered omnidirectional radiation pattern or can produce a wide steerable beam to illuminate a large volume of space. To achieve target angular accuracies and angular resolutions, the receiving subarrays of the MIMO antenna 114 can include multiple receive antenna elements to generate hundreds or thousands of narrow steered beams using techniques known as digital beamforming. The radar system 104 can efficiently monitor the environment 100 for the targets 108. The CRM 120 includes radar software 122 for analyzing the radar receive signal 112, detecting or tracking the target 108 based on the radar receive signal 112, and/or determining one or more characteristics (e.g., position or velocity) of the target 108 detected or being tracked.

The radar simulator 102 is configured to model hardware and/or software of the radar system 104, for instance, to enable performance of the radar system 104 to be evaluated and evaluated for various simulated environments. Throughout a development cycle of the radar system 104, the radar simulator 102 can be used to evaluate different system designs (e.g., different hardware configurations or different operational modes), evaluate different versions of the radar software 122, or verify requirements, for instance. Use of the radar simulator 102 enables design or implementation problems within the radar system 104 to be quickly discovered during design, integration, and testing phases prior to performing a live test. The radar simulator 102 performs operations to simulate the hardware of the radar system (e.g., parts of the MIMO antenna 114 and/or MMIC 116), the radar software 122 executed by the processor 124, or a combination thereof. The radar simulator 102 can also account for non-ideal characteristics of the radar system 104 or the environment 100, such as noise or non-linearities. In particular, the radar simulator 102 can model phase noise, waveform non-linearities, and uncorrelated noise within the MMIC 116. With these capabilities, the radar simulator 102 can have a similar noise floor and dynamic range as the radar system 104. The radar simulator 102 includes at least one processor 124 and computer-readable storage media 126. The CRM 126 can be implemented by one or more memory devices that enable persistent and/or non-transitory data storage. In some cases, the processor 124 and the CRM 126 are packaged together within an integrated circuit or on a printed circuit board. In other cases, the processor 124 and the CRM 126 can be implemented separately and operationally coupled together such that the processor 124 can access instructions stored by the CRM 126. The CRM 126 includes a radar hardware simulator 130 and a radar software simulator 132.

The radar hardware simulator 130 and the radar software simulator 132 execute to provide assurance that the radar system 104 can reliably aid in performing perception related tasks that are executed on the vehicle 106. The radar hardware simulator 130 and the radar software simulator 132 can simulate the radar system 104 to determine radar responses to be detected by the radar system 104 when one or more simulated targets 108 appear at different angles and ranges in a simulated radar field of view. In general, the radar hardware simulator 130 and the radar software simulator 132 can define the radar system 104 to be positioned to any type of moving platform, including moving machinery or robotic equipment. Although illustrated as car, the vehicle 106 can represent a truck or other type of ground vehicle, including other types of motorized vehicles (e.g., a motorcycle, a bus, a tractor, a semi-trailer truck, or construction equipment), non-motorized vehicles (e.g., a bicycle), railed vehicles (e.g., a train or a trolley car), and the like. The simulated mounting position of the radar system 104 may coincide with a top surface of the vehicle 106, and in other examples, the mounting position is on an underside or a lateral side of the vehicle 106. The radar hardware simulator 130 and the radar software simulator 132 may account for changes in far and near-field effects caused by a reflection plane on the ground or road surface that the vehicle 106 is positions. Different mounting positions of the radar system 104, for example, may be tested with the radar system 104 distributed at different mounting positions to simulate an instrumented field of view of anywhere from zero to three hundred and sixty degrees about the vehicle 106.

In this example, the processor 124 executes instructions for performing operations of the radar hardware simulator 130 and the radar software simulator 132. The radar hardware simulator 130 and the radar software simulator 132 can be implemented using software executing on the processor 124, alone or in combination, with operations performed by other hardware, executed as firmware, or implemented in a combination thereof. The radar hardware simulator 130 and/or the radar software simulator 132 include an interface for receiving environmental response data provided by the electromagnetic simulator 134. As one example, the environmental response data can include a single-point RCS for a target. Generally, the radar hardware simulator 130 and/or the radar software simulator 132 transform the environmental response data into a form that is useable by the radar simulator 102. For example, the environmental response data is adjusted by the radar simulator 102 to account for a precise antenna response of the MIMO antenna 114. The radar hardware simulator 130 models the MMIC 116. In particular, the radar hardware simulator 130 performs operations that simulate waveform generation, modulation, demodulation, multiplexing, amplification, frequency conversion, filtering, and/or analog-to-digital conversion operations performed by the MMIC 116 to determine expected responses. In other words, the radar hardware simulator 130 performs operations of the MMIC 116, which occur between the processor 118 and the MIMO antenna 114. The radar hardware simulator 130 can account for the radar system 104's dynamic range, as well as the presence of non-linear effects and noise (e.g., in a driving environment). The radar hardware simulator 130 can be used to verify different hardware configurations and operational modes of the radar system 104. The radar software simulator 132 models the radar software 122 of the radar system 104. In particular, the radar software simulator 132 performs digital baseband processing operations that simulate operations performed by the processor 118. These operations can include Fourier transforms (e.g., Fast Fourier transform), noise floor estimation, clutter map generation, constant-false alarm rate thresholding, object detection, and object position estimation (e.g., digital beamforming). In some cases, the radar software simulator 132 includes a version of the radar software 122. In this way, the radar simulator 102 can be used to verify software requirements and evaluate different software versions of the radar system 104. During operation, the radar simulator 102 accepts electromagnetic response data from the electromagnetic simulator 134 and generates a radar report. The radar report can be used to evaluate performance of the radar system 104 for a given simulated environment. By providing accurate electromagnetic response data to train or tune a model being evaluated by the radar simulator 102, the electromagnetic simulator 134 may improve accuracy of radar simulations and provide assurance that the radar system 104 can manage a wide range of driving scenarios.

The electromagnetic simulator 134 includes at least one processor 136 and computer-readable storage media 138. The CRM 138 may optionally include a ray launcher 140 and a ray tracer 142. The CRM 138 also includes an electromagnetic (EM) module 144. The ray launcher 140, the ray tracer 142, and the EM module 144 can be implemented using hardware, software, firmware, or a combination thereof. In this example, the processor 136 executes instructions for performing operations of the ray launcher 140, the ray tracer 142, and the EM module 144. If included in the electromagnetic simulator 134, the ray launcher 140 enables the electromagnetic simulator 134 to adaptively launch electromagnetic rays during a simulation. The ray tracer 142 enables the electromagnetic simulator 134 to trace rays launched during the simulations, including the reflections of the rays coming from targets in the simulation. The EM module 144 determines the electromagnetic response of each of the traced rays and may perform other operations to adjust the determined response to account for other conditions. The ray launcher 140, the ray tracer 142, and the EM module 144 are discussed in more detail below.

The electromagnetic simulator 134 can produce a simulated radar response determined for each of the simulated targets 108. Each of the simulated targets 108 may be associated with a target RCS output from the EM module 144. The target RCS output is input to the radar simulator to evaluate performance, or to help with tuning or training a model executed by the radar system 104 before the radar system 104 is physically deployed in the real-world. The electromagnetic simulator 134 simulates radar responses with signal-to-noise ratios greater than a detection threshold of the radar system 104. Each simulated target 108 is composed of one or more types of material that reflect radar signals. Depending on the application, the target 108 can represent a target of interest or clutter. In some cases, the target 108 is a moving target, such as another vehicle, a human, or an animal. In other cases, the target 108 is a stationary target, such as a continuous or discontinuous road barrier (e.g., a traffic cone, a concrete barrier, a guard rail, or a fence), a tree, or a parked vehicle. The electromagnetic simulator 134 may be tailored specifically for simulating targets that impact driving the most, including trucks, cars, or other large objects that can appear without warning in a travel lane of a road. The target RCS generated by the electromagnetic simulator 134 depends on multiple conditions, including target azimuth angle and target range. Unlike other simulators that report target RCS that is dependent on angle alone, the electromagnetic simulator 134 supports more accurate simulation and evaluations, without extra complexity. The radar response generated by the electromagnetic simulator 134 may account for multi-path reflections caused by a ground surface, which is also unique in comparison to other simulations.

Figure 2:
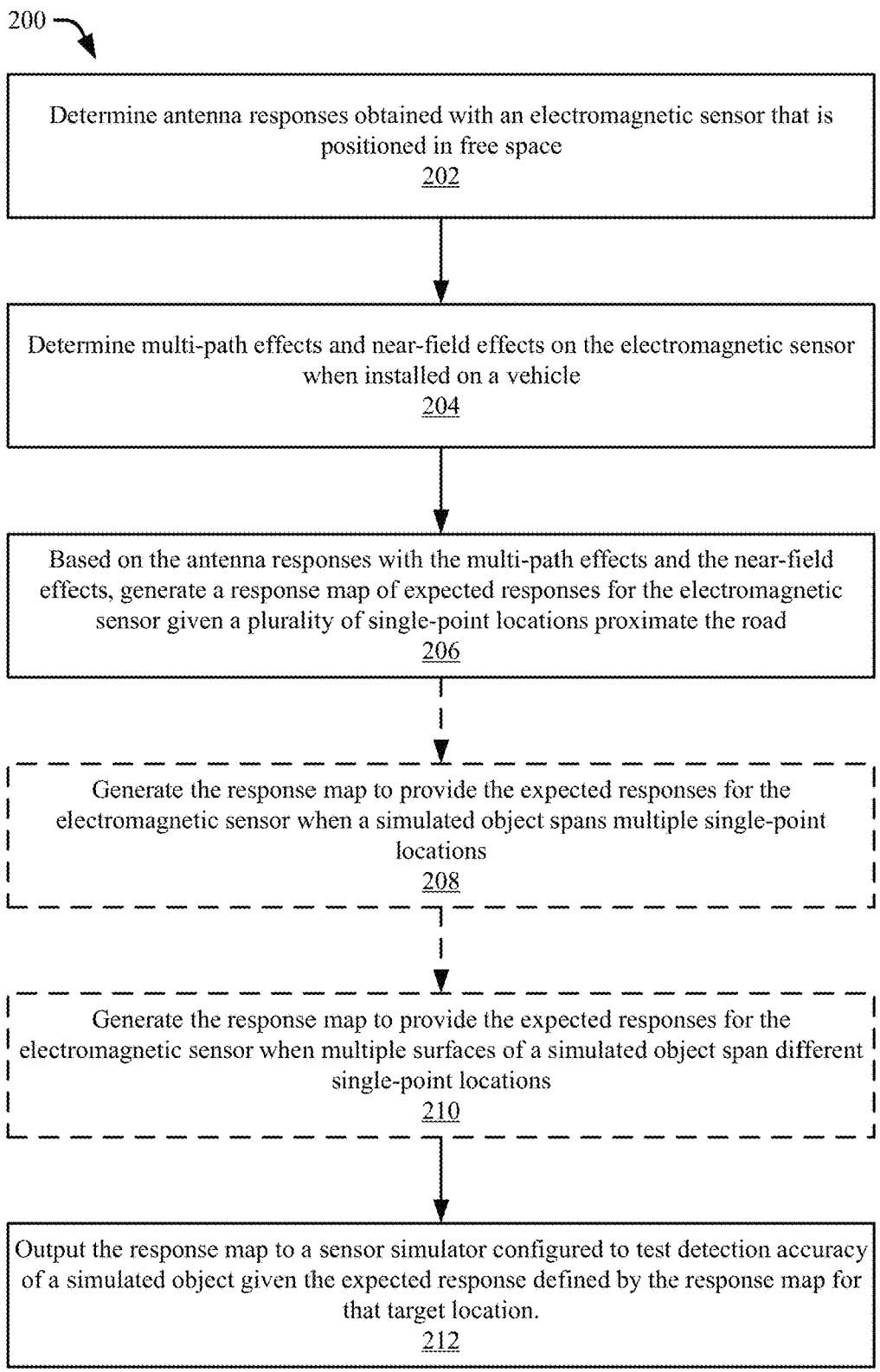
FIG. 2 illustrates a process for applying more-accurate single-point RCS approaches in radar simulation, in accordance with techniques of this disclosure.

FIG. 2 illustrates a process 200 for applying more-accurate single-point RCS approaches in radar simulation, in accordance with techniques of this disclosure. For ease of description, the process 200 is performed in the context of elements of FIG. 1. The process 200 may be performed by the electromagnetic simulator 134, the radar simulator 102, or a combination of the two. The steps of the process 200 may be repeated, rearranged, omitted, or otherwise modified depending on application. Likewise, the sensor simulator is generally referenced as a radar simulator, however, the techniques can benefit other sensor simulator types. As explained in reference to the process 200, when configured as a radar simulator, the sensor simulator is configured to test performance of radar hardware or radar software in detecting the simulated object given the expected response for the simulated object as defined by the response map for that particular single-point location.

As provided above, the far-field RCS simulation of a large object, by itself, is not suitable for radar simulations due to near-field effects that occur near the target. Existing simulations ignore road presence or fail to consider its effects on RCS in an adequate way. To account for this and facilitate more accurate radar simulation, the process 200 may be performed.

At step 202, antenna responses obtained with an electromagnetic sensor that is positioned in free space are determined over a plurality of target ranges. For example, actual antenna responses to represent RCS fluctuations caused by target range may be simulated, including for the near range. This simulation, for collecting the antenna responses simulated for each of the target ranges and for a plurality of angular intervals arranged about the electromagnetic sensor, may be performed using existing RCS simulation techniques based on the SBR method mentioned above, or variations thereof.

Figures 1, 3:
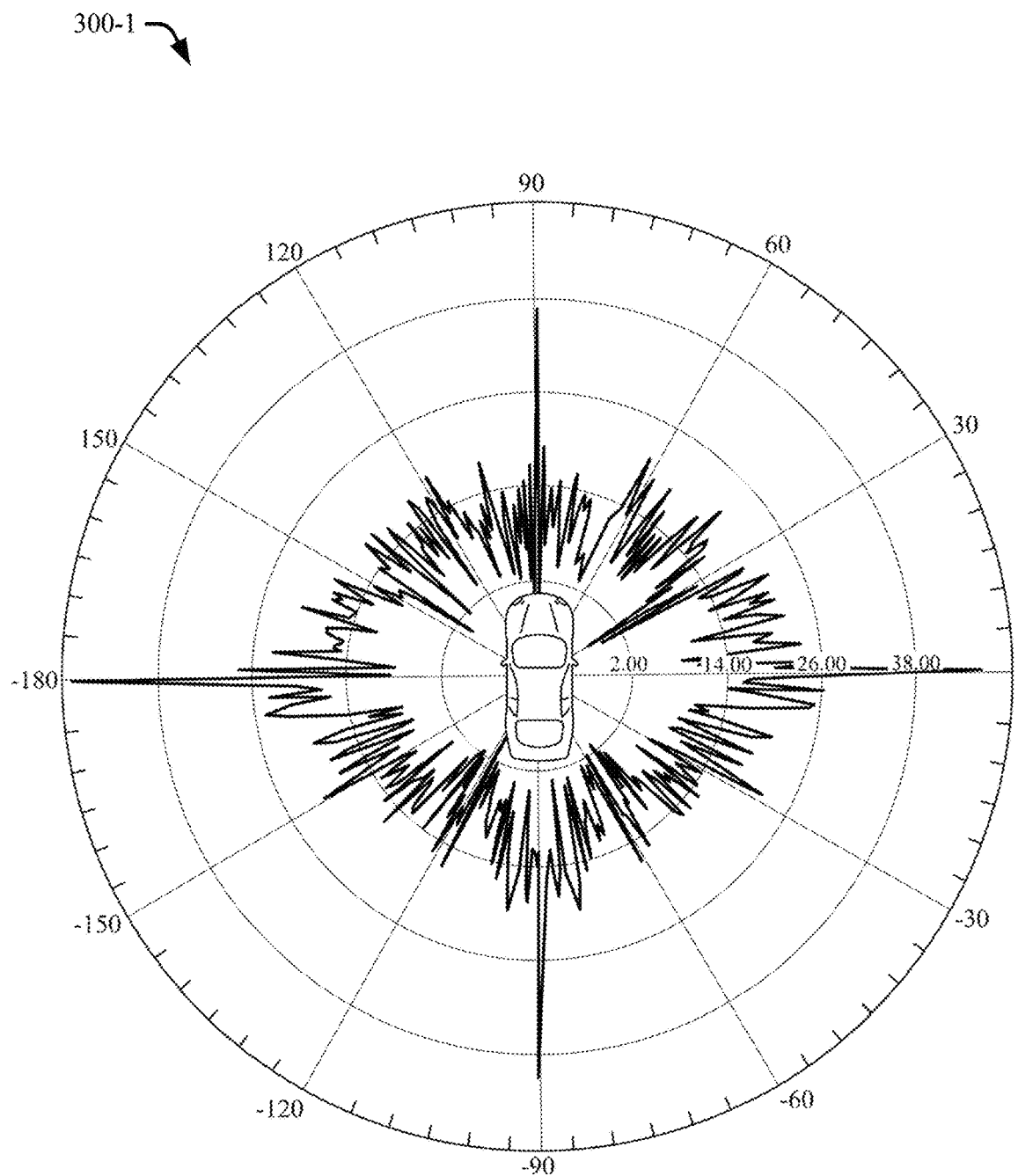
Figures 2, 3:
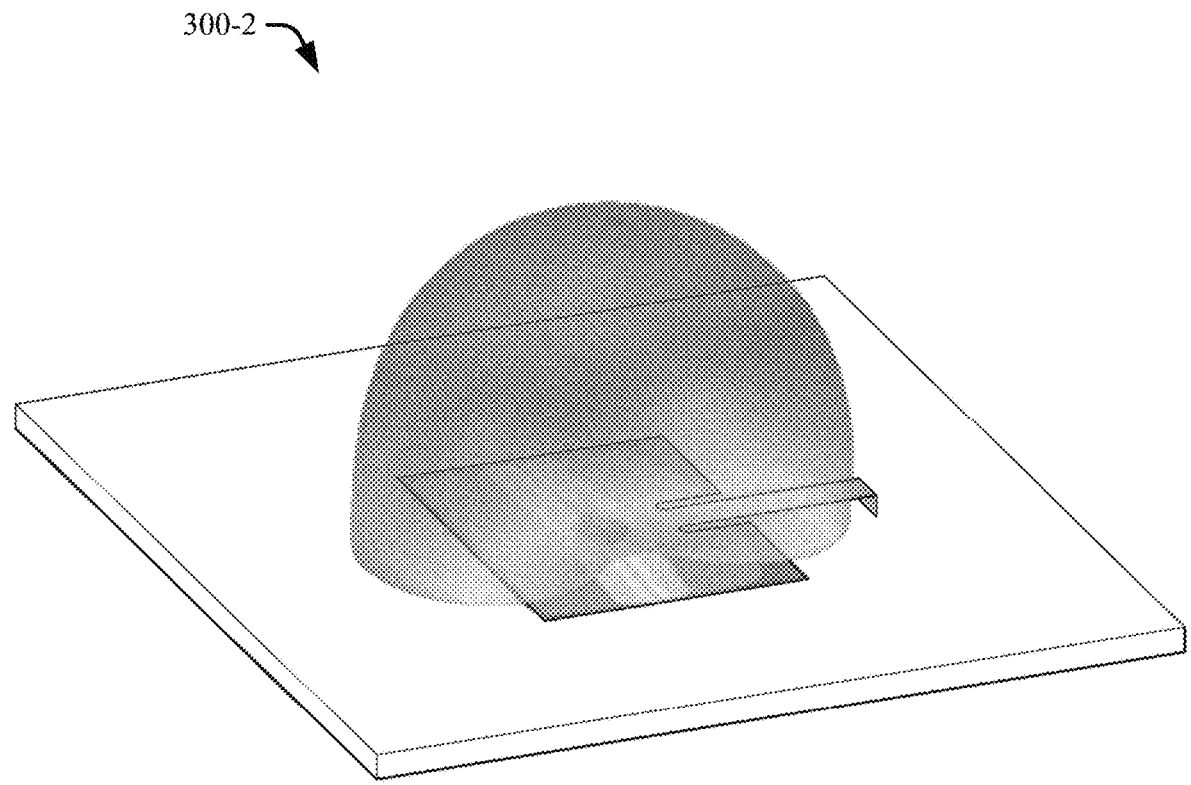
Figure 3:
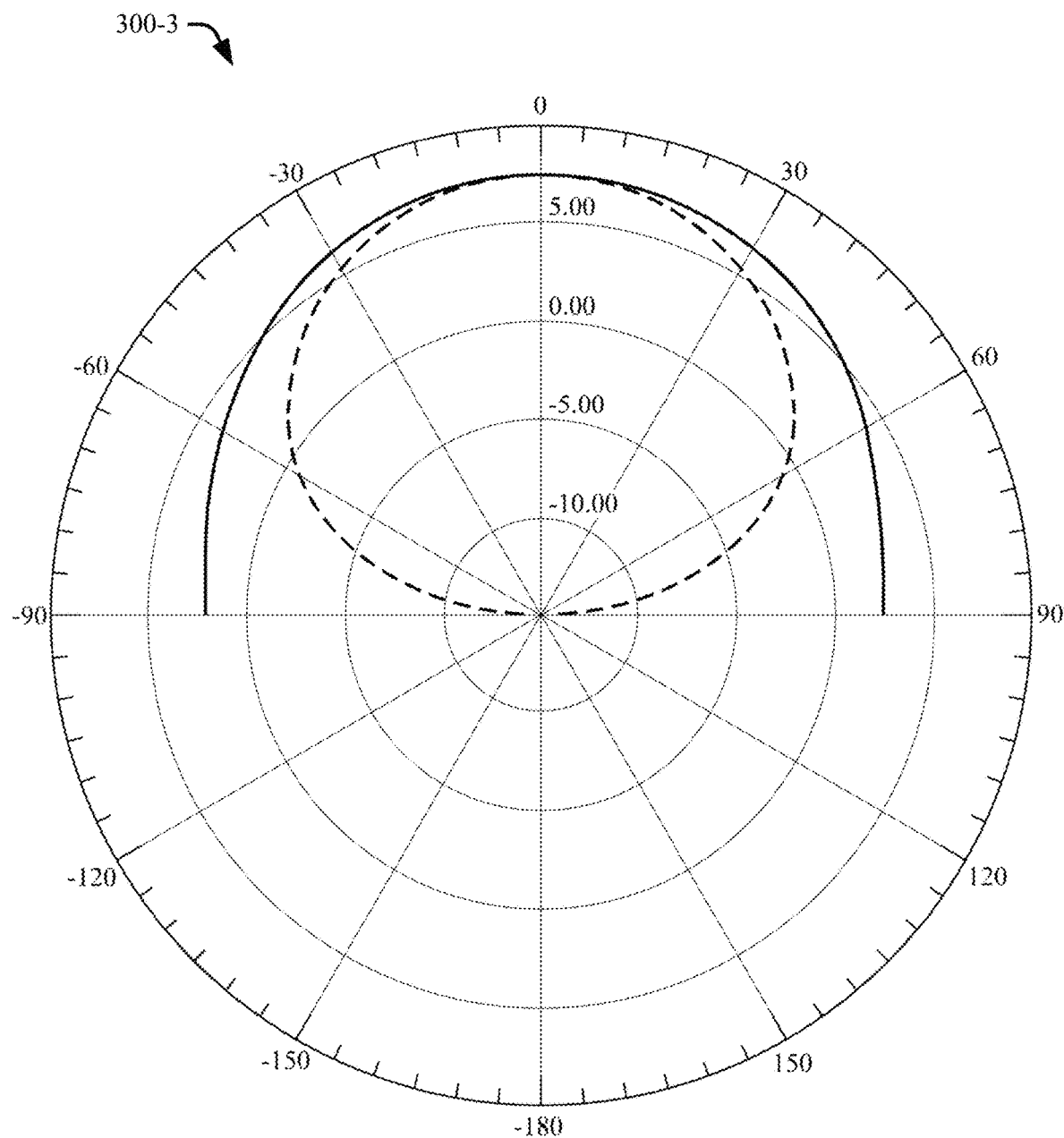

For example, commercially available modeling software (e.g., HFSS) can be used to calculate far-field RCS values in one-degree angular steps around a target (e.g., car), which results in a pattern 300-1 as shown in FIG. 3-1. The simulated far-field RCS of the car in FIG. 3-1 includes a peak within the pattern 300-1 of approximately forty-six decibel per square meter (dBsm). Note that this does not correspond to the target RCS computed by previous simulation techniques, which tend to produce the peak at slightly above twenty dBsm because the measurements are taken near the target (e.g., at a range of less than ten meters), and thus, in the near field of the target, which is calculated using the following Equation 1 (as explained in antenna theory literature such as Balanis, Constantine A. *Antenna Theory: Analysis and Design*, 4th Edition. Wiley, 2016):

$$d_F = 2 \cdot \frac{D^2}{\lambda} \quad \text{Equation 1}$$

In the above Equation 1, dF is the range at which the far-field region starts, D is the longest dimension of the target object, and λ is the wavelength of the radar transmit signal 110. Calculating RCS for a car with a five-meter length, at frequency of seventy-six giga hertz (GHz) results in a far-field region range of approximately twelve point seven kilometers (km). Therefore, the antenna at ten meters from the car is clearly in the near-field region. A parametric sweep can be conducted by the ray launcher 140 and the ray tracer 142 in both range and angle to create a more accurate RCS radial map for a target representation in free space. That is, the traditional approach to simulating the target RCS in far field is replaced with a simulation of a small antenna response at the target range, which delivers an accurate range dependent RCS for high RCS targets, here still without road reflection considered. Through adjusting a ray launcher and ray tracer to step through range and angle adjustments, the antenna responses can be collected in angular intervals for each of the target ranges.

To verify this step, a simulation with actual antennas may be performed to measure the RCS over a range from one meter to thirty kilometers. For example, the antenna may be designed as single inset-fed patch antenna at seventy-six GHz for both transmitter and receiver, which are shifted along a direction with almost no radiation. The patch antenna, with its far-field an electric field (E-field) distribution overlay is shown in FIG. 3-2, and a corresponding gain pattern at a cross section of zero and ninety degrees is shown in FIG. 3-3. In FIG. 3-3, the inner curved arc segments are for the vertical plane parallel to the direction of the feed line of the antenna shown in FIG. 3-2. The outer arc in FIG. 3-3 represents the perpendicular plane to the direction of the feed line. Commercial simulation software, such as the simulation provided in HFSS, provides scattering parameters between antennas, which relate directly to induced voltages on one antenna caused by electric fields generated by the other. Consider Equation 2, where E21 is the electric field at antenna two caused by a voltage V1 applied to antenna one, S21 is the scattering parameter/coupling between both antennas one and two, and G is a constant accounting for antenna characteristics such as gain and impedance, as follows.

$$E21 = G \cdot S21 \cdot V1 \quad \text{Equation 2}$$

Therefore, in lead up to calculating the RCS from the scattering parameters, the following formulas in Equations 3, 4, 5, and 6 may be used:

$$RCS = 4\pi \cdot r^2 \left( \frac{E_{21sc} - E_{21inc}}{E_{31ref}} \right) \quad \text{Equation 3}$$

$$RCS = 4\pi \cdot r^2 \left( \frac{E_{21sc} - E_{21inc}}{E_{31inc}} \right)^2, E_{31inc} = \left( \frac{E_{31ref} \cdot 1m}{r} \right) \quad \text{Equation 4}$$

$$RCS = 4\pi \cdot r^4 \left( \frac{E_{21sc} - E_{21inc}}{E_{31inc}} \right)^2 \cdot (1m^{-2}) \quad \text{Equation 5}$$

$$RCS = 4\pi \cdot \frac{r^4}{m^2} \left( \frac{S_{21sc} - S_{21inc}}{S_{31ref}} \right) \quad \text{Equation 6}$$

In the above, r is the range, $E21_{sc}$ is the electric field at Rx resulting from TX considering scattering off the target surface, while $E21_{inc}$ is the direct coupling between the two antennas due to low side waves, $E31_{inc}$ is the electric field at range r, where the target is located, representing the incident field in free space, and $E31_{ref}$ is the reference signal taken by the exact same antenna at one meter to avoid the need to measure the incident field directly and cancel the constant G and voltage V1 from the Equation 2. To verify this RCS simulation step, a small sphere with a radius of five hundredths of a meter is simulated due to it having an analytical formula to compare the results. The theoretical result is 0.0079 square meters while the simulated is 0.0081 square meters with an error of 2%, which is acceptable for many simulation applications. After that, a car model can be used to determine an RCS over range simulation.

Figures 3, 4:
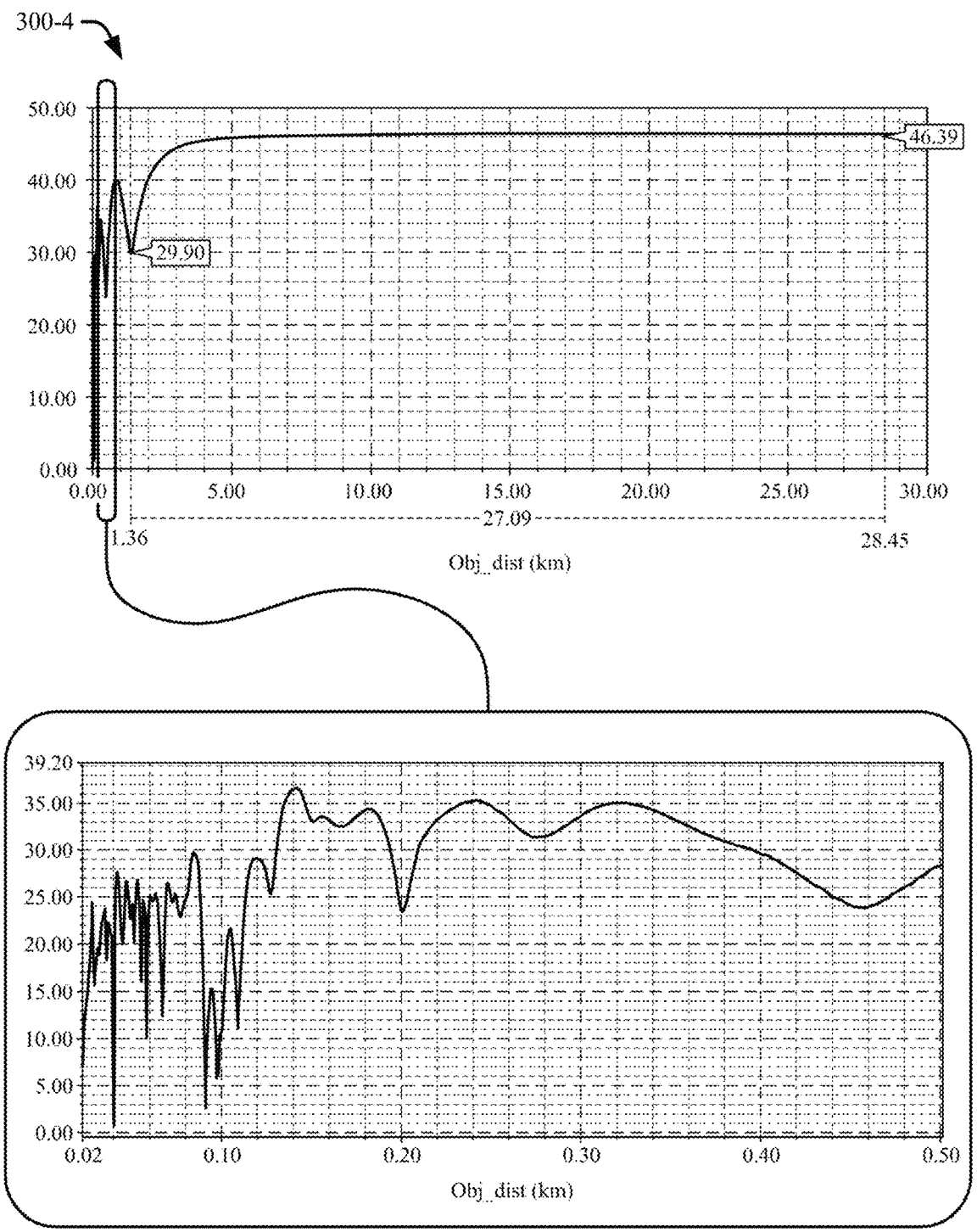
Figures 3, 4, 5:
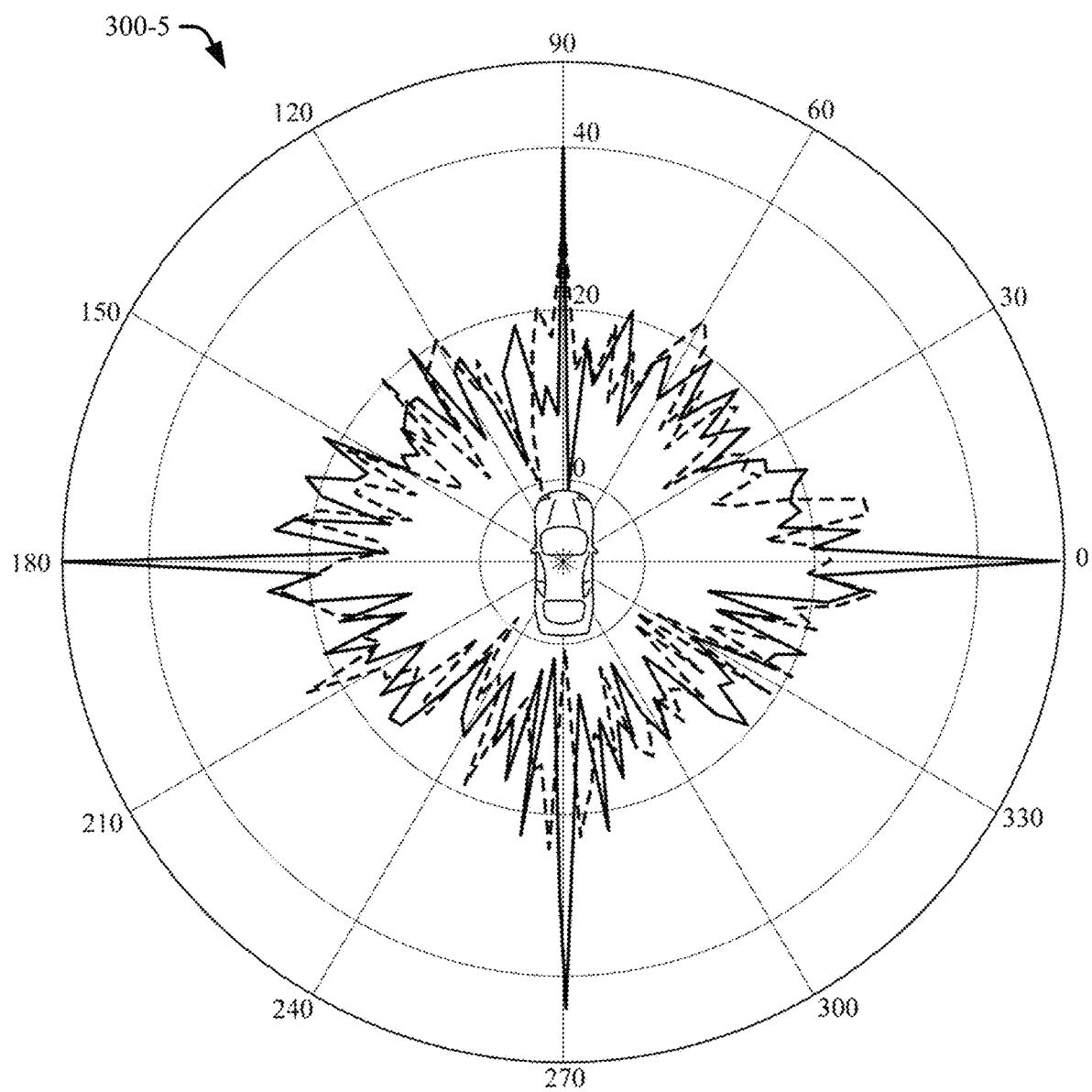
Figures 3, 4, 5, 6:
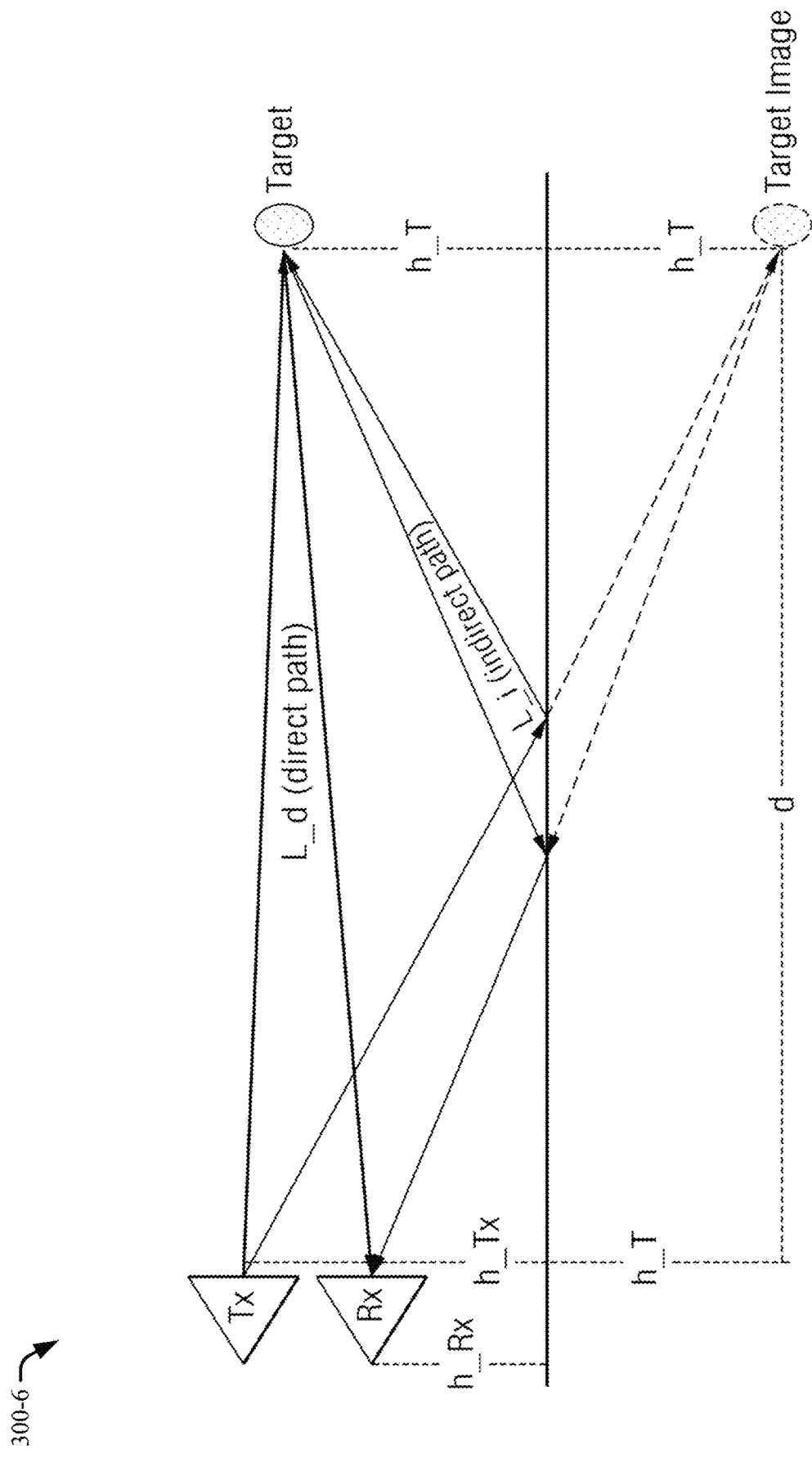
Figures 3, 4, 5, 6, 7:
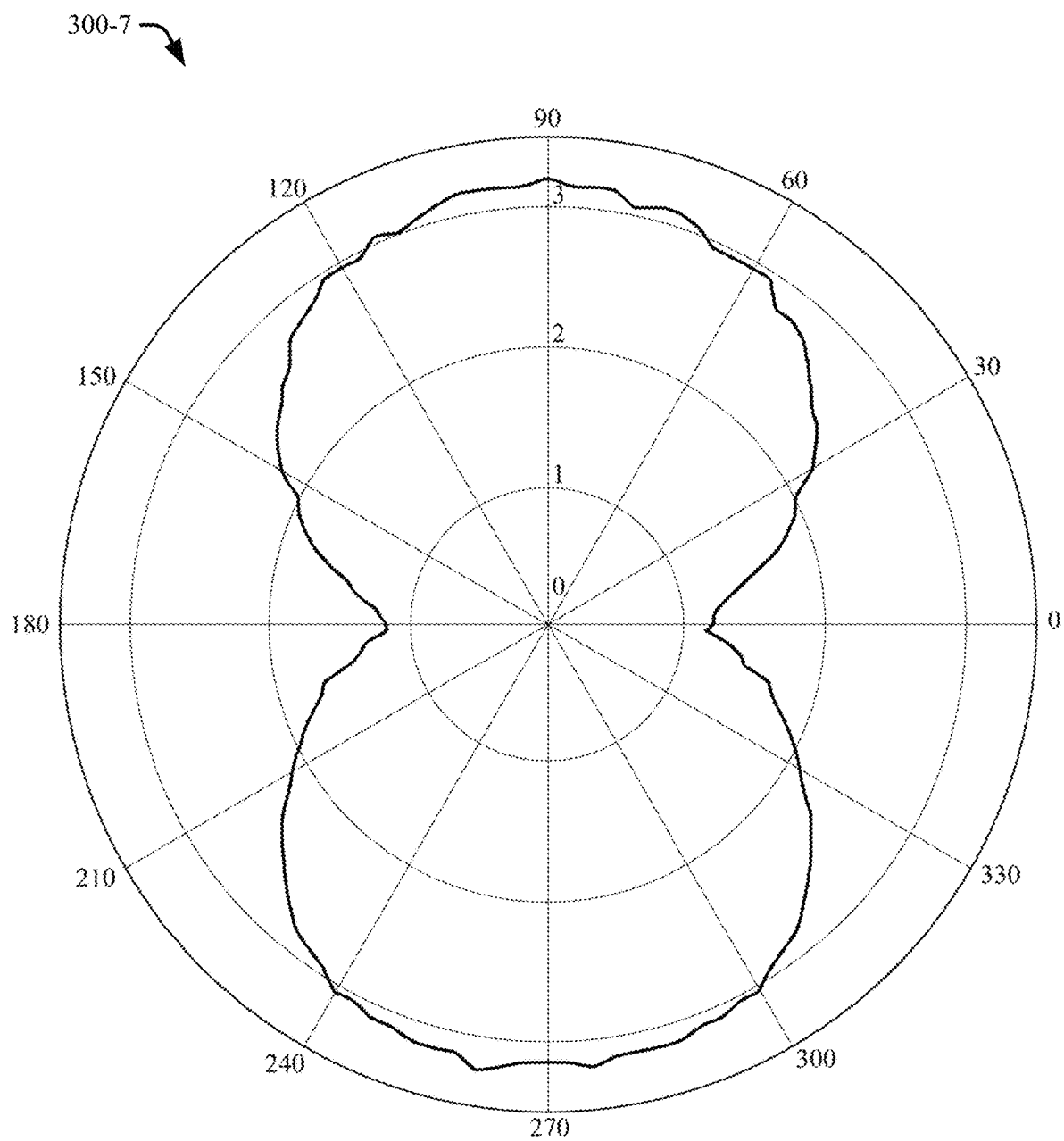
Figures 3, 4, 5, 6, 7, 8:
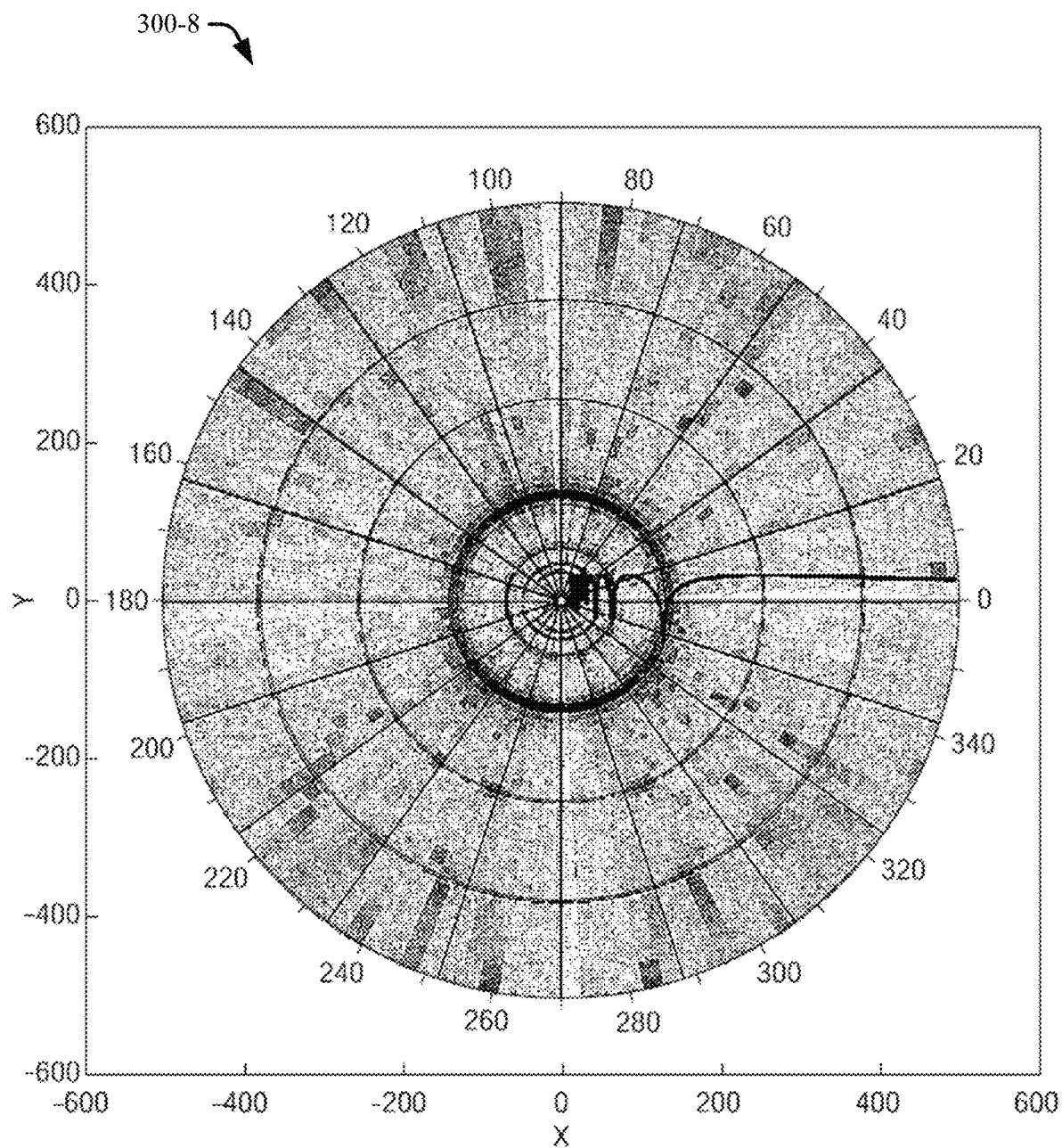

The resulting RCS over range profile is shown in FIG. 3-4, including a zoomed view. From FIG. 3-4, the RCS does converge on a high value of above forty dBsm. However, from the zoomed view, the RCS hardly fluctuates in the first five hundred meters; in the near range up to one hundred meters, the RCS fluctuates around twenty dBsm, which more closely approximates measurements typically taken in close range to the target. As such, the RCS may be simulated around a target car in an angular step (e.g., of three degrees) and for several ranges. FIG. 3-5 shows an example RCS pattern for ten meter and thirty-kilometer ranges. The maximum RCS at the far range is almost fifty dBsm, while at the near range it is slightly above twenty dBsm, which better corresponds to the measured values.

At step 204, multi-path effects and near-field effects on the electromagnetic sensor when installed on a vehicle determined for the plurality of target ranges. For example, existing simulation technology is used to consider range dependent road impacts to the target RCS in a computationally effective way. For example, with a multi-dimensional RCS map defined for a target, the multi-path effect can be applied analytically (e.g., using a four-path model) to account for ground reflections without modeling the ground, which is otherwise computationally complex and time consuming. To include the effect of the ground reflection, the four-path model is applied analytically to the RCS values at each angle and range from simulated results.

For example, a multi-path model can be used to account for potential multiple propagation paths of electromagnetic signals obtained by the electromagnetic sensor at each of the target ranges. From using the multi-path model, a combination of the response fluctuations caused by the multiple propagation paths can be determined at each of the target ranges. The multi-path model may be the four-path model, which considers the signal propagation from the transmitter to object and then reflects to the receiver in four different paths as shown in FIG. 3-6.

The four paths of the four-path model account for: a direct-direct (dd) propagation path, a direct-indirect (di) propagation path, an indirect-direct (id) propagation path, and an indirect-indirect (ii) propagation path. The signal at the receiver is determined from Equations 7, 8, 9, and 10, as follows:

$$E_{Rx\_total} = E_{Rx\_dd} + E_{Rx\_di} + E_{Rx\_id} + E_{Rx\_ii} \quad \text{Equation 7}$$

$$E_{Rx\_p} = \frac{\Gamma_p \cdot A_T}{L_{1p}} \cdot E_{target} \cdot e^{-ik(L_{1p}+L_{2p})} \quad \text{Equation 8}$$

$$E_{target} = \frac{E_{0Tx} \cdot 1m}{L_{2p}} \quad \text{Equation 9}$$

$$E_{Rx\_p} = \frac{\Gamma_p \cdot A_T}{L_{1p} \cdot L_{2p}} \cdot E_{0Tx} \cdot e^{-ik(L_{1p}+L_{2p})} \cdot 1m \quad \text{Equation 10}$$

$E_{Rx\_p}$ is the signal at the receiver over the path p, $L_{1p}$ and $L_{2p}$ are the forward and backward path lengths respectively, both calculated geometrically as illustrated in FIG. 3-6, $E0_{Tx}$ is the signal strength at one meter from the transmitter, k is the wave number $2\pi/\lambda$, and $\Gamma_i$ is the reflection coefficient for each path, which equals one for dd, the ground reflection coefficient $\Gamma_g$ for di and id, and $(\Gamma_g)^2$ for ii, while $A_T$ accounts for the RCS of the target in the Equation 11:

$$A_T = \sqrt{\frac{RCS}{4\pi}} \quad \text{Equation 11}$$

The term $A_T \cdot E0_{Tx}$ is estimated from the simulation result by multiplying the return signal in free space by $r^2$ and then it is applied in Equation 7, assuming it is equal in the four paths for this application.

At step 206, based on the antenna responses with the multi-path effects and the near-field effects, a response map is generated of expected responses for the electromagnetic sensor given a plurality of single-point locations proximate the vehicle. A set of response fluctuations for the electromagnetic sensor may be determined at each of the target ranges based on the antenna responses. The antenna responses and/or the response fluctuations are resolved with the multi-path effects and the near-field effects to generate the expected responses to account for a corresponding angular and range dependent ground effect simulated for any single-point location. For example, the information obtained from both road multi-path and near field simulations are combined to create a more accurate angular and range dependent RCS map associated with a single-point representation of a target for fast environmental simulations. For example, the response map is generated from applying the set of response fluctuations determined for each of the target ranges at step 202 with the multi-path effects and the near-field effects determined for that target range at step 204. The combination of the response fluctuations caused by the multiple propagation paths at each of the target ranges is used to determine the corresponding angular and range dependent ground effects to be applied to the expected responses defined in the response map.

At step 212, the response map is output to a sensor simulator configured to test the detection accuracy of a simulated object located at a particular single-point location given the expected response defined by the response map for that particular single-point location. For example, the response map that is output from the electromagnetic simulator may be an RCS radial map considering multi-path effects, which can be used as input to the radar hardware simulator 130 or the radar software simulator 132 to support fast execution of radar simulations, without nearly the complexity or computing resources needed to perform ray-tracing methods, yet still able to achieve comparable accuracy in simulated radar response.

For example, the response map output at step 212 may be provided to an environmental response data interface of the sensor simulator that transforms the expected responses defined by the response map into environmental response data for simulating electromagnetic returns from simulated objects. Using the response map, the sensor simulator is able to uniquely account for the corresponding angular and range dependent ground effects defined by the response map for each simulated object location.

Responsive to outputting the response map to the sensor simulator at step 212, the sensor simulator may be executed to test whether the hardware or software of the electromagnetic sensor accurately detects the simulated object at that particular single-point location from processing the expected response defined by the response map for that particular single-point location. Results of the test executed by the sensor simulator may be output (e.g., to a file, for display) to indicate whether performance of the hardware or software satisfies criteria for controlling the vehicle based on sensor data output from the electromagnetic sensor.

To increase the accuracy, a prior step is conducted to extract a contour of the target car to shift the scattering center of the RCS from the origin of the target to the car's surface. A frequency sweep is performed at each angular step at a range of ten meters to obtain an impulse response, and then an inverse Fourier transform (IFFT) is performed to generate the range profile. Afterwards, the range of the first significant peak is stored in a look-up table to be used for correction. FIG. 3-7 shows a contour resulting from this step; FIG. 3-8 shows the single-point RCS multi-dimensional (e.g., angle and range dependent) pattern with multi-path ground effects, and an overlay of the range profile to convey how the RCS fluctuates in angle and based on other conditions, such as range.

At step 208, accuracy can optionally be improved in the response map yet further by representing important targets (e.g., cars and trucks) as many RCS points rather than a single-point RCS. This enables the response map to be used as input to a sensor simulator configured to test whether hardware or software of the electromagnetic sensor accurately detects a simulated object that appears at multiple single-point locations, rather than just one location, given the expected response defined by the response map for each of the multiple single-point locations. For example, additionally, if the point target simulations examples described above are adjusted to consider the size of the target, the response map may indicate a shift in the reflection position to be near a surface point of the target, from which the expected response including accurate RCS dependence given range and/or angle can be applied.

At step 210, with multiple RCS points, the simulation can optionally be programmed to account for occlusion and directivity caused between two sections of the same target. The response map can be further improved to enhance this type of sensor simulator to enable a test of whether hardware or software of the electromagnetic sensor accurately detects a simulated object that having a first surface that is occluded or has directivity influenced by a second surface. For instance, from grouping the expected response defined by the response map for each of the multiple single-point locations on the first surface separate from the expected response defined by the response map for each of the multiple single-point locations on the second surface, the simulated object has different surfaces appearing at different single-point locations, rather than just one location. Given the expected response defined by the response map for each of the multiple single-point locations, the multiple expected responses at the different surfaces can be combined. For example, extracting several scattering centers to represent a target can be considered to improve the accuracy of the response map.

On the same processor(s) or different processor executing the steps 202 to 212, the process 200 can further include executing the sensor simulator including providing the response map as an input to the sensor simulator. For example, the sensor simulator may test whether hardware or software of the electromagnetic sensor accurately detects a simulated object that appears at multiple single-point locations including when the simulated object has a first surface that is occluded or has directivity influenced by a second surface Some additional embodiments include the following:

Embodiment 1: A method comprising: determining, over a plurality of target ranges, antenna responses obtained with an electromagnetic sensor that is positioned in free space; determining, for the plurality of target ranges, multi-path effects and near-field effects on the electromagnetic sensor when located on a vehicle; based on the antenna responses with the multi-path effects and the near-field effects, generating a response map of expected responses for the electromagnetic sensor given a plurality of single-point locations proximate the vehicle, each expected response accounting for a corresponding angular and range dependent ground effect determined for that single-point location; and outputting the response map to a sensor simulator configured to test detection accuracy of a simulated object located at a particular single-point location given the expected response defined by the response map for that particular single-point location.

Embodiment 2: The method of any previous embodiment, wherein the expected responses each include a target radar cross section adjusted for the corresponding angular and range dependent ground effect determined for that single-point target location.

Embodiment 3: The method of any previous embodiment, wherein the target radar cross section for each of the expected responses is dependent on a target angle and target range between the vehicle and that single-point target location.

Embodiment 4: The method of any previous embodiment, wherein the expected responses each have a target signal to noise ratio that is greater than a detection threshold of the electromagnetic sensor.

Embodiment 5: The method of any previous embodiment, wherein determining the antenna responses comprises: collecting the antenna responses determined for each of the target ranges and for a plurality of angular intervals arranged about the vehicle.

Embodiment 6: The method of any previous embodiment, wherein collecting the antenna responses comprises: adjusting a ray launcher and ray tracer to step through range and angle adjustments for collecting the antenna responses in angular intervals for each of the target ranges.

Embodiment 7: The method of any previous embodiment, further comprising: determining, based on the antenna responses, a set of response fluctuations for the electromagnetic sensor at each of the target ranges; and generating the response map from applying the set of response fluctuations determined for each of the target ranges with the multi-path effects and the near-field effects simulated for that target range.

Embodiment 8: The method of any previous embodiment, wherein determining the multi-path effects and near-field effects on the electromagnetic sensor when located on the vehicle comprises: using a multi-path model to account for multiple propagation paths of electromagnetic signals obtained by the electromagnetic sensor at each of the target ranges to determine a combination of the response fluctuations caused by the multiple propagation paths at each of the target ranges.

Embodiment 9: The method of any previous embodiment, wherein the multi-path model comprises a four-path model to account for a direct-direct propagation path, a direct-indirect propagation path, an indirect-direct propagation path, and an indirect-indirect propagation path.

Embodiment 10: The method of any previous embodiment, wherein the combination of the response fluctuations caused by the multiple propagation paths at each of the target ranges is used to determine the corresponding angular and range dependent ground effects to be applied to the expected responses defined in the response map.

Embodiment 11: The method of any previous embodiment, wherein the electromagnetic sensor comprises a radar, and the sensor simulator comprises a radar simulator.

Embodiment 12: The method of any previous embodiment, wherein the radar simulator is configured to test performance of radar hardware or radar software in detecting the simulated object given the expected response for the simulated object as defined by the response map for that particular single-point location.

Embodiment 13: The method of any previous embodiment, wherein outputting the response map to the sensor simulator comprises: providing the response map to an environmental response data interface of the sensor simulator, the data interface transforming the expected responses defined by the response map into environmental response data for enabling the sensor simulator to simulate electromagnetic returns from simulated objects by uniquely accounting for the corresponding angular and range dependent ground effects defined by the response map for each simulated object location.

Embodiment 14: The method of any previous embodiment, wherein outputting the response map to the sensor simulator comprising outputting the response map to configure the sensor simulator to test the detection accuracy of the simulated object at that particular single-point location from processing the expected response defined by the response map for that particular single-point location.

Embodiment 15: The method of any previous embodiment, further comprising: outputting the response map to another sensor simulator configured to test detection accuracy of another simulated object that appears at multiple single-point locations based on the expected response defined by the response map for each of the multiple single-point locations.

Embodiment 16: The method of any previous embodiment, further comprising: outputting the response map to another sensor simulator configured to test whether the electromagnetic sensor accurately detects a simulated object having a first surface that is occluded or has directivity influenced by a second surface based on a group of the expected responses defined by the response map for each of the single-point locations on the first surface separate from the expected response defined by the response map for each of the single-point locations on the second surface.

Embodiment 17: A system comprising at least one processor configured to perform the method of any previous embodiments.

Embodiment 18: A system comprising means for performing the method of any previous embodiments.

Embodiment 19: A computer-readable storage media comprising instructions that, when executed, cause at least one processor to perform the method of any previous embodiments.

Embodiment 20: A computer system comprising a radar simulation software program configured to perform the method of any previous embodiments.

Embodiment 21: A computer software product configured to execute on computer hardware to cause the computer hardware to perform the method of any previous embodiments.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure or as defined by the following claims. Problems associated with simulating an environmental electromagnetic response can occur in other systems. Therefore, although described to improve electromagnetic responses for a radar simulator, the techniques of the foregoing description can be applied to other systems that simulate other electromagnetic sensors.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    determining, over a plurality of target ranges, antenna responses obtained with an electromagnetic sensor that is positioned in free space;
    determining, for the plurality of target ranges, multi-path effects and near-field effects on the electromagnetic sensor when located on a vehicle;
    based on the antenna responses with the multi-path effects and the near-field effects, generating a response map of expected responses for the electromagnetic sensor given a plurality of single-point locations proximate the vehicle, each expected response accounting for a corresponding angular and range dependent ground effect determined for that single-point location; and
    outputting the response map to a sensor simulator configured to test detection accuracy of a simulated object located at a particular single-point location given the expected response defined by the response map for that particular single-point location.

2. The method of claim 1, wherein the expected responses each include a target radar cross section adjusted for the corresponding angular and range dependent ground effect determined for that single-point target location.

3. The method of claim 2, wherein the target radar cross section for each of the expected responses is dependent on a target angle and target range between the vehicle and that single-point target location.

4. The method of claim 2, wherein the expected responses each have a target signal to noise ratio that is greater than a detection threshold of the electromagnetic sensor.

5. The method of claim 1, wherein determining the antenna responses comprises:
    collecting the antenna responses determined for each of the target ranges and for a plurality of angular intervals arranged about the vehicle.

6. The method of claim 5, wherein collecting the antenna responses comprises:
    adjusting a ray launcher and ray tracer to step through range and angle adjustments for collecting the antenna responses in angular intervals for each of the target ranges.

7. The method of claim 1, further comprising:
    determining, based on the antenna responses, a set of response fluctuations for the electromagnetic sensor at each of the target ranges; and
    generating the response map from applying the set of response fluctuations determined for each of the target ranges with the multi-path effects and the near-field effects simulated for that target range.

8. The method of claim 7, wherein determining the multi-path effects and near-field effects on the electromagnetic sensor when located on the vehicle comprises:

using a multi-path model to account for multiple propagation paths of electromagnetic signals obtained by the electromagnetic sensor at each of the target ranges to determine a combination of the response fluctuations caused by the multiple propagation paths at each of the target ranges.

9. The method of claim 8, wherein the multi-path model comprises a four-path model to account for a direct-direct propagation path, a direct-indirect propagation path, an indirect-direct propagation path, and an indirect-indirect propagation path.

10. The method of claim 8, wherein the combination of the response fluctuations caused by the multiple propagation paths at each of the target ranges is used to determine the corresponding angular and range dependent ground effects to be applied to the expected responses defined in the response map.

11. The method of claim 1, wherein the electromagnetic sensor comprises a radar, and the sensor simulator comprises a radar simulator.

12. The method of claim 11, wherein the radar simulator is configured to test performance of radar hardware or radar software in detecting the simulated object given the expected response for the simulated object as defined by the response map for that particular single-point location.

13. The method of claim 1, wherein outputting the response map to the sensor simulator comprises:
providing the response map to an environmental response data interface of the sensor simulator, the data interface transforming the expected responses defined by the response map into environmental response data for enabling the sensor simulator to simulate electromagnetic returns from simulated objects by uniquely accounting for the corresponding angular and range dependent ground effects defined by the response map for each simulated object location.

14. The method of claim 1, wherein outputting the response map to the sensor simulator comprising outputting the response map to configure the sensor simulator to test the detection accuracy of the simulated object at that particular single-point location from processing the expected response defined by the response map for that particular single-point location.

15. The method of claim 1, further comprising:
outputting the response map to another sensor simulator configured to test detection accuracy of another simulated object that appears at multiple single-point locations based on the expected response defined by the response map for each of the multiple single-point locations.

16. The method of claim 1, further comprising:
outputting the response map to another sensor simulator configured to test whether the electromagnetic sensor accurately detects a simulated object having a first surface that is occluded or has directivity influenced by a second surface based on a group of the expected responses defined by the response map for each of the single-point locations on the first surface separate from the expected response defined by the response map for each of the single-point locations on the second surface.

17. A non-transitory storage media comprising instruction that, when executed, cause at least one processor to:
determine, over a plurality of target ranges, antenna responses obtained with an electromagnetic sensor that is positioned in free space;
determine, for the plurality of target ranges, multi-path effects and near-field effects on the electromagnetic sensor when located on a vehicle;
based on the antenna responses with the multi-path effects and the near-field effects, generate a response map of expected responses for the electromagnetic sensor given a plurality of single-point locations proximate the vehicle, each expected response accounting for a corresponding angular and range dependent ground effect determined for that single-point location; and
output, by the processor, the response map to a sensor simulator configured to test the detection accuracy of a simulated object located at a particular single-point location given the expected response defined by the response map for that particular single-point location.

18. A system comprising at least one processor configured to:
determine, over a plurality of target ranges, antenna responses obtained with an electromagnetic sensor that is positioned in free space;
determine, for the plurality of target ranges, multi-path effects and near-field effects on the electromagnetic sensor when located on a vehicle;
based on the antenna responses with the multi-path effects and the near-field effects, generate a response map of expected responses for the electromagnetic sensor given a plurality of single-point locations proximate the vehicle, each expected response accounting for a corresponding angular and range dependent ground effect determined for that single-point location; and
output, by the processor, the response map to a sensor simulator configured to test the detection accuracy of a simulated object located at a particular single-point location given the expected response defined by the response map for that particular single-point location.

19. The system of claim 18, wherein the at least one processor is further configured to:
execute the sensor simulator based on the response map as an input to the sensor simulator.

20. The system of claim 19, wherein the at least one processor is further configured to execute the sensor simulator to test detection accuracy of another simulated object appearing at multiple single-point locations including when the simulated object has a first surface that is occluded or has directivity influenced by a second surface.

* * * * *